US012679974B2

(12) United States Patent
Terryn et al.

(10) Patent No.: US 12,679,974 B2
(45) Date of Patent: Jul. 14, 2026

(54) SELF-HEALING POLYMERS

(71) Applicant: Vrije Universiteit Brussel, Brussels (BE)

(72) Inventors: Seppe Terryn, Mechelen (BE); Joost Brancart, Grimbergen (BE); Guy Van Assche, Hoeilaart (BE); Bram Vanderborght, Hoeilaart (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 714 days.

(21) Appl. No.: 18/021,294

(22) PCT Filed: Aug. 23, 2021

(86) PCT No.: PCT/EP2021/073290

§ 371 (c)(1),
(2) Date: Feb. 14, 2023

(87) PCT Pub. No.: WO2022/038297

PCT Pub. Date: Feb. 24, 2022

(65) Prior Publication Data

US 2023/0295425 A1 Sep. 21, 2023

(51) Int. Cl.
*C08L 79/08* (2006.01)
*C08G 73/06* (2006.01)

(52) U.S. Cl.
CPC .......... *C08L 79/08* (2013.01); *C08G 73/0672* (2013.01); *C08L 2203/20* (2013.01)

(58) Field of Classification Search
USPC .......................................................... 528/170
See application file for complete search history.

(56) References Cited

U.S. PATENT DOCUMENTS

2014/0353549 A1 12/2014 Mayo

OTHER PUBLICATIONS

E. Roels, S. Terryn, J. Brancart, G. Van Assche and B. Vanderborght, "A Multi-Material Self-Healing Soft Gripper," 2019 2nd IEEE International Conference on Soft Robotics (RoboSoft), Seoul, Korea (South), 2019, pp. 316-321. (Year: 2019).*
International Search Report and Written Opinion mailed Nov. 26, 2021 in reference to co-pending to PCT/EP2021/073290 filed Aug. 23, 2021.
European Search Report in reference to co-pending European Application. No. 20192135 filed Aug. 21, 2020.
Roels Ellen et al: "A Multi-Material Self-Healing Soft Gripper", 2019 2nd IEEE International Conference on Soft Robotics (Robosoft), IEEE, Apr. 14, 2019 (Apr. 14, 2019), pp. 316-321.
Strachota Beata et al: "Control of Gelation and Properties of Reversible Diels-Alder Networks: Design of a Self-Healing Network", Polymers, vol. 11, No. 6, May 28, 2019 (May 28, 2019), p. 930.
Seppe Terryn et al: "Self-healing soft pneumatic robots", Science Robotics, vol. 2, No. 9, Aug. 16, 2017 ( Aug. 16, 2017), pp. 1-12.

* cited by examiner

*Primary Examiner* — Terressa Boykin
(74) *Attorney, Agent, or Firm* — DINSMORE & SHOHL LLP

(57) ABSTRACT

The present invention relates to Diels-Alder-based polymers comprising the reaction product of a composition comprising a polymaleimide and a monomeric unit. The Diels-Alder-based polymers may be self-healing polymers. The Diels-Alder-based polymers may be used in 3D printing, flexible electronics and soft robotics. Furthermore, the present invention relates to structures comprising said Diels-Alder-based polymers.

20 Claims, 5 Drawing Sheets

SELF-HEALING POLYMERS

FIELD OF THE INVENTION

The present invention relates to self-healing polymers and uses thereof in various domains, such as additive manufacturing, electronics and robotics. Furthermore, the present invention relates to compositions and structures comprising said polymers.

BACKGROUND TO THE INVENTION

Any material which is applied in any type of application domain is susceptible to a certain degree of degradation over time. This degradation may be caused for instance by environmental conditions, incurred damage during operation or other external factors. Depending on the type of material and the associated material-specific properties, aspects such as the degradation rate may vary. Depending on the type of application purpose, different types of materials will be suitable and are generally selected in function of the material-specific properties (e.g. weight, rigidity, flexibility, stability, conductive properties, porosity, . . . ). Often, when materials are used, materials can be damaged (e.g. material cracks, ruptures, cuts, scratches, . . . ). In this case, an external intervention is necessary to repair the damage. If the damage is too severe or repairing the damage would be disadvantageous (e.g. due to high costs, prolonged repair times), partial or full replacement of the materials might be necessary. All in all, materials might be damaged, and repair might be necessary over time for the materials and parts made thereof to remaining functional.

Materials which could intrinsically correct damage could prevent costs and would be highly beneficial, especially in those areas where parts are frequently damaged. An example of such an area is robotics and more specifically the application of soft grippers. Robots are susceptible to damage such as fatigue, degradation and micro-cracking throughout their lifetime. When focusing on soft grippers, these products can be deployed in agriculture and food packaging, which is made possible by embodied intelligence, being the role of an agent's body in generating behavior which allows control to be outsourced to a smart design. When used for fruit and vegetable picking, these soft grippers come in close contact with sharp objects (e.g., sharp twigs, thorns, plastic or glass). As a result, macroscopic damages (e.g., perforations, cuts and ruptures) occur over time and negatively impact the performance of these grippers.

Usually, these soft grippers are produced out of relative cheap materials, such as elastomers, such as silicones and polyurethanes, resulting in replacement rather than repair of damaged grippers. However, this requires time-consuming and costly human intervention as well as a considerable amount of new resources and waste material over time, having an ecologic impact which cannot be neglected. Because of those downsides, the use of self-healing materials can be seen as promising alternatives to minimize external intervention and allow the damaged materials to be repaired, making material replacement superfluous. Robots will also be used in remote applications, like search-and-recovery or environmental investigations in (aero)space or marine environments, where it becomes difficult to repair or replace a damaged part. Because of this, robots are ideal candidates to introduce self-healing ability by developing structural components out of self-healing polymers. In addition, most robotic concepts are nature-inspired and therefore it makes sense to incorporate this remarkable healing ability in robots.

Self-healing materials already exist today and have the ability to repair damage without the need to replace these materials. However, a number of drawbacks are known. For extrinsic healing systems, relying on the encapsulation of a healing agent, the healing action may often take place a limited number of times only at the same damage location. Also, the healing mechanism is often unsuitable for healing damages of a considerable size. Furthermore, these healing mechanisms are only available in stiff materials, not offering the flexibility that is highly beneficial, for instance, in soft gripper construction. In many intrinsic healing systems, either an external stimulus is required, or the material strength is insufficient for the production of larger 2D or 3D structures having sufficient strength and retention of structural integrity.

Having said that, there is still room for improving the characteristics of self-healing polymers in order to tackle at least some of the mentioned drawbacks. This way, self-healing materials might be used in an increased number of application domains, such as the development of different parts, e.g., soft grippers, within areas such as robotics, electronics, mechatronics and automation.

A specific type of self-healing materials is the Diels-Alder (DA) polymer network and it provides a solution to most of the aforementioned drawbacks. This network is based on a reversible Diels-Alder reaction between the functional diene (e.g. furan) and dienophile (e.g. maleimide) groups, effectuating the self-healing characteristics. The process of cross-linking within these polymers is the most important aspect of the specific self-healing characteristics of the Diels-Alder polymers which is based on strong covalent bonding, allowing the production of larger 2D or 3D structures having sufficient mechanical strength even after self-healing.

The current invention relates to a novel Diels-Alder polymer network having self-healing capabilities even at room temperatures and below, without the need for external intervention. Consequently, healing may occur within the material itself without the need of actively increasing the ambient temperature, nor subjecting to irradiation of a specific type, while acquiring optimal healing efficiencies. Therefore, the need for add-on systems providing external heat stimuli becomes superfluous.

Depending on the size of the damage, the location of the damage, and the time that is available, self-healing of these novel Diels-Alder polymer networks might even occur autonomously, without any external intervention.

SUMMARY OF THE INVENTION

In a first aspect, the present invention provides a Diels-Alder polymer comprising the reaction product of a composition comprising a polymaleimide and a monomeric unit according to formula (I)

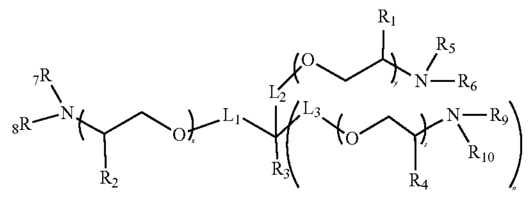

Wherein, $R_1$, $R_2$ and $R_4$ independently represent H or $C_1$-$C_4$ alkyl; in particular $CH_3$; $R_3$ represents $C_1$-$C_4$ alkyl; in particular $CH_3$; $R_5$ to $R_{10}$ independently represent H or A; A independently represents a furan-comprising functional group; L1 to L3 independently represent a direct bond or a divalent $C_1$-$C_4$ alkyl; in particular $CH_2$; n is 0 or 1; x+y+z is an integer selected from 1 to 75; and characterized in that both said polymaleimide and polyfuran monomeric unit comprise a functionality of at least 2 and in that the sum of the functionalities of both said polymaleimide and polyfuran is at least 4.6. In a particular embodiment characterized in that both said polymaleimide and polyfuran monomeric unit comprise a functionality of at least 2 and in that at least one of said polymaleimide or monomeric unit comprises a maleimide or furan functionality of at least 3.

In a next embodiment, said Diels-Alder polymer comprises a maleimide or furan functionality of at least 3, in particular from 3 to 8.

Unless provided otherwise, the maleimide-to-furan stoichiometric ratio should be understood as the molar ratio of maleimide groups to furan groups.

In a further embodiment, the maleimide-to-furan stoichiometric ratio between the polymaleimide and the monomeric unit of said Diels-Alder polymer is smaller than 1, i.e. comprising an excess of furan functional groups with respect to maleimide groups. In one embodiment, the maleimide-to-furan stoichiometric ratio between the polymaleimide and the monomeric unit of said Diels-Alder polymer ranges from 0.05 to 0.65. In another embodiment, the maleimide-to-furan stoichiometric ratio between the polymaleimide and the monomeric unit of said Diels-Alder polymer ranges from 0.25 to 0.65.

In another embodiment, the furan-comprising functional group of said Diels-Alder polymer is selected from the list comprising: furfuryl ethers, furfuryl glycidyl ether, furfuryl alcohols, 2-furoic acid, 3-furoic acid and combinations thereof.

In another embodiment, the polymaleimide of said Diels-Alder polymer is selected from the list comprising: 1,1'-(methylenedi-4,1-phenylene)bismaleimide, N,N'-(1,4-phenylene)dimaleimide, N,N'-(1,3-phenylene)dimaleimide, polyphenylmethanebismaleimide and combinations thereof.

In a next aspect, a composition comprising a Diels-Alder polymer as defined herein is disclosed.

In some embodiments, the composition comprising Diels-Alder polymer as defined herein or composition comprising the polymaleimide and the monomeric unit according to formula (I) further comprises a radical scavenger.

In another embodiment, said radical scavenger is selected from the list comprising: hydroquinone, butylated hydroxytoluene, 4-tert-butylcatechol, methyl-p-benzoquinone . . . .

It is also an object of the present invention to provide a method of preparing the Diels-Alder polymer as herein disclosed, said method comprising the step of preparing a composition comprising a polymaleimide and a monomeric unit according to formula (I)

(I)

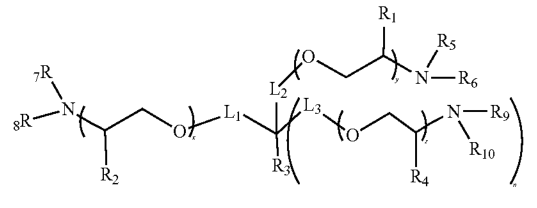

wherein $R_1$ to $R_4$ independently represent H or $C_1$-$C_4$ alkyl, in particular $CH_3$; $R_5$ to $R_{10}$ independently represent H or A; A independently represents a furan-comprising functional group; L1 to L3 independently represent a direct bond or a divalent C1-C4 alkyl; in particular —$CH_2$—; n is 0 or 1; x+y+z is an integer selected from 3 to 75; and characterized in that both said polymaleimide and polyfuran monomeric unit comprise a functionality of at least 2 and in that the sum of the functionalities of both said polymaleimide and polyfuran is at least 4.6; and allowing the Diels-Alder polymerization reaction between said polymaleimide and a monomeric unit according to formula (I) to occur.

In another embodiment, the composition of said method further comprises a radical scavenger.

In yet another aspect, the use of said Diels-Alder polymer or said composition as self-healing materials is disclosed.

In yet a further embodiment, the use of said Diels-Alder polymer or said composition in applications where elastomers are typically used, such as flexible electronics, robotics, biomedicine, aerospace, automotive and the like, is disclosed.

In a following embodiment, the use of said Diels-Alder polymer or said composition in a method selected from the list comprising: filament extrusion, fused filament fabrication, direct ink writing, selective laser sintering, injection moulding, compression moulding, casting or soft lithography.

It is accordingly an object of the present invention to provide the use of said Diels-Alder polymer or said composition in the manufacturing of 2D or 3D structures, more particular in the manufacturing of robotic components and flexible electronics is disclosed. In a following aspect, a 2D or 3D structure comprising said Diels-Alder polymer is disclosed.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

Figure 1:
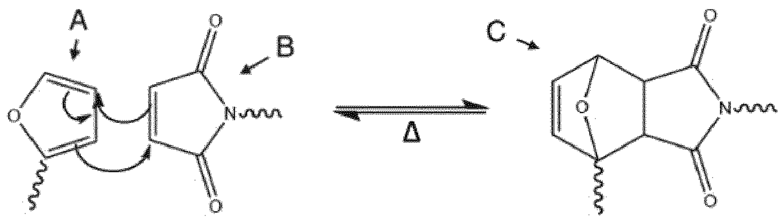
FIG. 1, also abbreviated as FIG. 1 discloses a chemical Diels-Alder reaction scheme between a furan A and maleimide B group resulting in a Diels-Alder reaction product C according to an embodiment of the current invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Unless a context dictates otherwise, asterisks are used herein to indicate the point at which a mono- or bivalent radical depicted is connected to the structure to which it relates and of which the radical forms part.

When describing the compounds of the invention, the terms used are to be construed in accordance with the following definitions, unless a context dictates otherwise:

The term "alkyl" by itself or as part of another substituent refers to a fully saturated hydrocarbon of Formula $C_xH_{2x}$ or $C_xH_{2x+1}$ wherein x is a number greater than or equal to 1. Generally, alkyl groups of this invention comprise from 1 to 20 carbon atoms. Alkyl groups may be linear or branched and may be substituted as indicated herein. When a subscript is used herein following a carbon atom, the subscript refers to the number of carbon atoms that the named group may contain. Thus, for example, $C_{1-4}$ alkyl means an alkyl of one to four carbon atoms. Examples of alkyl groups are methyl, ethyl, n-propyl, i-propyl, butyl, and its isomers (e.g. n-butyl, i-butyl and t-butyl); pentyl and its isomers, hexyl and its isomers, heptyl and its isomers, octyl and its isomers, nonyl and its isomers; decyl and its isomers. $C_1$-$C_6$ alkyl includes all linear, branched, or cyclic alkyl groups with between 1 and 6 carbon atoms, and thus includes methyl, ethyl, n-propyl, i-propyl, butyl and its isomers (e.g. n-butyl, i-butyl and t-butyl); pentyl and its isomers, hexyl and its isomers, cyclopentyl, 2-, 3-, or 4-methylcyclopentyl, cyclopentylmethylene, and cyclohexyl. Whenever used in the present invention the term "compounds of the invention" or a similar term is meant to include the compounds of general Formula I and any subgroup thereof. This term also refers to their derivatives, such as solvates, hydrates, stereoisomeric forms, racemic mixtures, tautomeric forms, and optical isomers.

As used in the specification and the appended claims, the singular forms "a", "an", and "the" include plural referents unless the context clearly dictates otherwise. By way of example, "a compound" means one compound or more than one compound. The terms described above and others used in the specification are well understood to those in the art. The compounds of the present invention can be prepared according to the reaction scheme provided in the examples hereinafter, but those skilled in the art will appreciate that these are only illustrative for the invention and that the compounds of this invention can be prepared by any of several standard synthetic processes commonly used by those skilled in the art of organic chemistry.

In a first aspect, the present invention provides a Diels-Alder polymer comprising the reaction product of a composition comprising a polymaleimide and a monomeric unit according to formula (I)

(I)

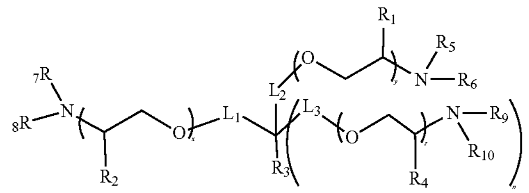

Wherein, $R_1$ to $R_4$ independently represent H or $C_1$-$C_4$ alkyl, in particular $CH_3$; $R_5$ to $R_{10}$ independently represent H or A; A independently represents a furan-comprising functional group; $L_1$ to $L_3$ independently represent a direct bond or a divalent $C_1$-$C_4$ alkyl; in particular —$CH_2$—; n is 0 or 1; x+y+z is an integer selected from 1 to 75; and characterized in that both said polymaleimide and polyfuran monomeric unit comprise a functionality of at least 2 and in that the sum of the functionalities of both said polymaleimide and polyfuran is at least 4.6

As mentioned herein and unless provided otherwise, the term "Diel-Alder polymer" should be understood as a polymer network containing reversible covalent crosslinks, formed by a Diels-Alder bond between a furan and a maleimide. The network structure is formed using two monomers, being a furan-functionalized polyether amine according to Formula (I) and a polymaleimide, in particular a bismaleimide. The furan-functionalized polyether amines could be based on diamines (in case n equals 0) or on triamines (in case n equals 1), in either instance comprising at least one ether or polyether moiety

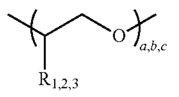

with a, b, c being an integer selected from 1 to 75. Consequently, in the furan-functionalized polyether amines according to Formula (I), each of x, y or z can be 0 with the proviso that at least one of x, y or z is an integer selected from 1 to 75. The Diels-Alder reaction, forming said Diels-Alder bonds, is an equilibrium reaction making the formed crosslink bonds dynamic. Bonds are constantly broken and reformed in said dynamic network over time. However, a crosslink density is able to be defined for a specific temperature as long as this temperature remains unchanged.

In the event that Diels-Alder networks are damaged, Diels-Alder bonds are locally broken in a reversible fashion, resulting in active fracture surfaces. To effectuate healing of this damaged area, a first part of the self-healing process is bringing the fractured surfaces back into contact. Depending on the size of the damage, manual intervention or intervention by the robotic system might be necessary to actively push both fractured surfaces back together, for example when the material is cut all the way through and two separate pieces are formed. Such full cuts require both fractured pieces to be pushed back together to initiate the healing process. In this case, it is of importance that both pieces are pushed back together as soon as possible after the damage occurred. In this case, the self-healing process can be described as non-autonomous.

The fracture surfaces are brought back into contact as soon as possible, preferably within 1 to 2 hours after the damage occurred. Otherwise, the available reactive groups (maleimide and furan) will react with each other in the separate parts, resulting in a decrease of healing rate and efficiency for a given healing time. Still, parts that are separated for longer times, can be healed with high efficiencies if the healing times are increased to the order of weeks or if the temperature is raised to above 50° C.

After the fractured surfaces are brought back together (autonomously or non-autonomously), the self-healing process is initiated. At this moment, a risk of microscopic misalignments and small cavities created between said fractured surfaces exists. This is where the mobility of the Diels-Alder network of the present invention plays an essential role. The specific Diels-Alder polymer properties of the current application allow for a so-called self-sealing zipping effect, wherein the edges of the microscopic cavities are pulled together by the exothermal formation of Diels-Alder bonds and cohesive forces. Gradually, the entire cavities and fractured surfaces are being healed as such. Depending on the size of the damage, no manual intervention is necessary for initiating this self-sealing zipping effect. In this case, the self-healing process can be described as autonomous.

As used herein and unless provided otherwise, the concept of "autonomous self-healing" should be understood as the ability of self-healing materials (e.g. Diels-Alder polymers) to be healed when damaged, without the need for detection or repair by external intervention of any kind (e.g. the need of increasing temperatures, the need of manually bringing into contact the fracture surfaces).

In some embodiments, self-healing occurs at temperatures below 30, 29, 28, 27, 26, 25, 24, 23, 22, 21, 20, 19, 18, 17, 16, 15, 14, 13, 12, 11, 10, 5° C.

In some embodiments, self-healing efficiency may occur at temperatures about and between 10, 15, 20° C. and 30, 40, 50° C., particular about and between 15, 20, 25° C. and 30, 35, 40° C. and even more particular about and between 17.5; 20; 22.5° C. and 27.5; 30, 32.5° C.

In some embodiments, the increase of temperatures may improve the self-healing efficiency, but it remains a characteristic of the Diels-Alder polymer according to the invention that the self-healing process can occur at these lower ambient temperatures.

As used herein and unless provided otherwise, the term "self-healing efficiency" should be understood as the recovery of a material property and measured by the ratio of the measured property after healing to the initial material property, being the property before damage. Healing efficiencies are based on mechanical moduli, mechanical strength, characterised by fracture stresses and fracture strains. Said efficiency may be expressed in percentages.

In some embodiments, self-healing efficiencies of about 80, 90, 100%, in particular of about 90, 95, 99%, more particular of about 96, 97, 98% may be achieved at room temperature. Self-healing efficiencies of about 80, 90% are already realized after about 7 to 10 days at about 25° C. Self-healing efficiencies of about 96, 97, 98% are already realized after about 14 to 18 days at about 25° C. Self-healing efficiencies of about 96.5; 97; 97.5% may be achieved after about 13, 14, 15 days of self-healing, all at about 25° C.

A second part in the self-healing process of the current invention is temperature control. The temperature may influence the self-healing efficiency. It is an advantage of the current self-healing process that self-healing can occur at room temperature, and therefore without having to actively increase the temperature. As used herein and unless provided otherwise, the term "room temperature" is to be understood as temperatures ranging from about 20° C. to about 30° C. To accomplish healing around room temperatures, one of the important aspects to be controlled is crosslink density. As used herein and unless provided otherwise, the term "crosslinking" of polymers should be understood as the process of forming relatively short sequences of chemical bonds to join two polymer chains together, ultimately leading to the formation of a polymer network structure.

Said crosslink density is influenced by the stoichiometric ratio of the initial functional maleimide-to-furan groups of the current invention. A decrease of said stoichiometric ratio creates a maleimide deficit resulting in a decreased crosslink density. As a result, the network mobility is increased. An increased network mobility enhances the ability of the polymer of the current invention to heal macroscopic damages of the material that create large cavities between the fracture surfaces. Also, the excess of furan provides for more reactive furan components at the fracture surface, which enhances the healing rate. Besides that, the excess of furan provides that the concentration of furan remains at more elevated levels as the healing occurs, which enhances the rate of Diels-Alder reaction.

It is an advantage of the current invention that the Diels-Alder polymer comprises both the necessary chain mobility in the network and reactive components of sufficient concentration to heal macroscopic damage at room temperature with high healing efficiency at considerable rate.

In a further embodiment, the maleimide-to-furan stoichiometric ratio between the polymaleimide and the monomeric unit of said Diels-Alder polymer ranges from 0.05 to 0.65, particular from about 0.20 to 0.65, more particular from about 0.40 to 0.65; even more particular the maleimide-to-furan stoichiometric ratio between the polymaleimide and the monomeric unit of said Diels-Alder polymer may be about 0.5.

A third part of the self-healing process concerns the time of self-healing. In some embodiments of the current invention, healing times may range from hours to days, more specifically from about 1, 2, 3, 4, 5, 10, 15, 20, 24 hours to about 1, 2, 3, 4, 5, 6, 7, 8, 9, 10, 15, 20, 30 days. Besides the temperature, also the time of self-healing will influence the healing efficiency. The longer one allows the damaged material to repair itself (i.e. keeping the fracture surfaces in good contact), the higher the healing efficiency at a given temperature will be. Among other things, aspects such as the maleimide-to-furan ratio, the available reactive groups, flexibility of the monomer units, the crosslink density, the molecular mobility, the healing temperature and the time between the fracture and the contact of the fracture surfaces influence the healing times required to achieve a certain healing efficiency.

In some embodiments, healing times may be reduced by elevating healing temperatures. However, it is an advantage of embodiments of the current invention that healing occurs at room temperature and even below room temperature.

As evident from the examples hereinafter, using the Diels-Alder polymers according to the invention a healing efficiency of about 97% may be achieved within about 14 days of healing time at room temperature.

In some embodiments, the damaged surface of the Diels-Alder polymer may be completely recovered in that the initial strength of the Diels-Alder polymer is completely regained. Per reference to the examples hereinafter, such complete recovery wherein the initial strength of the Diels-Alder polymer is completely regained, was in particular found to occur in case of realignment of the fractured surfaces when brought in contact with one another.

In a next embodiment, said Diels-Alder polymer comprises a maleimide or furan functionality of at least 2.6, in particular from 3 to 8. The availability of at least 2.6 maleimide or furan functional groups effectuates self-healing at room temperature and below, since a minimal number of functional groups is necessary to accomplish the healing process at said temperatures and in order to form a polymer network.

In another embodiment, the furan-comprising functional group of said Diels-Alder polymer is selected from the list comprising: furfuryl ethers, furfuryl glycidyl ether, furfuryl alcohols, 2-furoic acid, 3-furoic acid, and combinations thereof; in particular the furfuryl glycidyl ether.

In another embodiment, the polymaleimide of said Diels-Alder polymer is selected from the list comprising: 1,1'-(methylenedi-4,1-phenylene)bismaleimide, N,N'-(1,4-phenylene)dimaleimide, N,N'-(1,3-phenylene)dimaleimide, bismaleimide, polyphenylmethanebismaleimide, and combinations thereof; in particular the polymaleimide of said Diels-Alder polymer is selected from the list comprising: 1,1'-(Methylenedi-4,1-phenylene)bismaleimide, N,N'-(1,4-phenylene)dimaleimide, N,N'-(1,3-phenylene)dimaleimide, polyphenylmethanebismaleimide.

In some embodiments, a Diels-Alder polymer comprising a reaction product of a composition comprising furfuryl glycidyl ether as the furan-comprising functional group and 1,1'-(methylenedi-1,4-phenylene)bismaleimide as the polymaleimide of said Diels-Alder polymer.

In a next aspect, a composition comprising a Diels-Alder polymer as defined herein is disclosed. In some embodiments, the composition comprising Diels-Alder polymer as defined herein or composition comprising the polymaleimide and the monomeric unit according to formula (I) further comprises a radical scavenger. Radical scavengers may be added to said composition to prevent side reactions such as maleimide homopolymerization. In some embodiments, the radical scavenger may be selected from the list comprising: hydroquinone, butylated hydroxytoluene 4-tert-butylcatechol, methyl-p-benzoquinone and the like.

In a next aspect, a method of preparing a Diels-Alder polymer is disclosed, wherein said method comprises the step of preparing a composition comprising a polymaleimide and a monomeric unit according to formula (I)

(I)

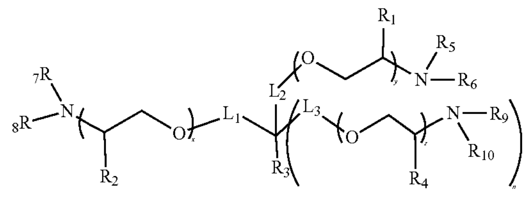

wherein $R_1$ to $R_4$ independently represent H or $C_1$-$C_4$ alkyl, in particular $CH_3$; $R_5$ to $R_{10}$ independently represent H or A; A independently represents a furan-comprising functional group; $L_1$ to $L_3$ independently represent a direct bond or a divalent $C_1$-$C_4$ alkyl; in particular —$CH_2$—; n is 0 or 1; x+y+z is an integer selected from 1 to 75; and characterized in that both said polymaleimide and polyfuran monomeric unit comprise a functionality of at least 2 and in that the sum of the functionalities of both said polymaleimide and polyfuran is at least 4.6; and allowing the Diels-Alder polymerization reaction between said polymaleimide and a monomeric unit according to formula (I) to occur. It should be clear to the skilled in the art that Diels Alder polymer obtained from monomeric units according to formula (I) comprising monomeric units having different x, y, z, would be provided with polymer average x, y, z which are non-integer.

As mentioned herein before, in one embodiment, the polymerization reaction is performed in the presence of radical scavengers, such as hydroquinone, to inhibit the homopolymerization reaction of the polymaleimides present in the composition. Such homopolymerization is an undesired side effect, consuming reagents and not contributing to the self-healing properties of the Diels-Alder polymer according to the invention. Use of such radical scavengers is known to the skilled in the art, used for example in concentration of about 1 mol % in comparison to the number of maleimide functional groups present in the composition.

In one embodiment, the composition used in the Diels-Alder polymerization reaction may further comprise additives, adding functionality or characteristics such as color, texture, tactile experience, flexibility, processability, viscosity at higher temperatures, electrical conductivity and the like to the reaction product.

In yet another aspect, the use of said Diels-Alder polymer or said composition as self-healing materials is disclosed.

In a following embodiment, the self-healing of said use is realized by the following steps: bringing into contact the fracture surfaces at room temperature and during a predetermined healing time.

In some embodiments, the self-healing may happen by said fracture surfaces being brought into contact autonomously, resulting in autonomously self-healing materials.

In some embodiments, in particular when a complete recovery wherein the initial strength of the DA polymer network is desired, the self-healing method includes realigning the fractured surfaces when bringing said surfaces into contact with one another.

In yet a further embodiment, the use of said Diels-Alder polymer or said composition in robotics, electronics or biomedicine is disclosed.

In some embodiments, the use in robotics may constitute the subfield of soft robotics. As used herein and unless provided otherwise, the term "soft robotics" should be understood as a subfield of robotics covering the construction of robotic parts and robots from different types of materials approaching the properties of those found in living organisms. These materials often require a certain amount of flexibility and adaptability depending on their specific purpose.

In some embodiments, the use in electronics may constitute the subfield of flexible electronics, such as in self-healing flexible sensors and self-healing flexible heaters. The term "flexible electronics", should be understood as a subfield of electronics covering construction of electronic components, e.g. electronic circuits, which are bendable and/or stretchable.

It has been found that 2D or 3D structures comprising the Diels-Alder-based polymer of the present invention, are especially advantageous when used as self-healing flexible sensors and self-healing flexible heaters.

Even though self-healing polymers can be provided to heal at room temperature, such as the ones according to the present invention, healing of large damages might take more time than what is required by a specific application. To beneficially provide for a faster healing process, a stimulus providing system, such as a heater, can be provided to heat the self-healing polymer. With the aim of quickening the healing times, a heater can be integrated in the 2D or 3D structure. As such a soft robot with integrated stimulus-providing system, e.g., a heater, can heal without human intervention, even though constructed out of non-autonomous self-healing polymer. In addition, using this approach, healing of partially damaged components can be postponed until mission completion. Furthermore, prior to healing, cleaning and alignment can be checked for an optimum recovery.

In accordance with the present invention, a self-healing flexible heater can be obtained by mixing and/or coating a Diels-Alder based polymer an electrically conductive or a magnetic agent, to achieve a resistive or inductive self-healing flexible heater, respectively. By passing a current through the electrically conductive agent, the temperature of the heater material rises by means of resistive Joule heating, providing a thermal stimulus for faster healing of the self-healing heater and the surrounding self-healing material.

In a further embodiment, compositions comprising a Diels-Alder polymer according to the present invention may further be combined with a conductive agent, in the form of a filler or coating, which is adapted to render the self-healing materials or parts thereof conductive. Suitable conductive agents comprise carbon black (CB), graphene, silver nanowires (AgNWs), copper nanowires (CuNWs), nanoclay, carbon nanotubes and liquid metals.

Further, Diels-Alder polymers according to the present invention can also be used in self-healing flexible sensors, especially useful in the field of soft robots. Soft robots particularly benefit from the use of flexible sensors, which provide for a limited influence on mechanical properties. Ideally, the influence becomes so small that it can no longer be measured: the sensor is 'mechanically invisible'. Further, by being self-healing, the sensor renders the soft robot less vulnerable to damage, as said sensor can heal itself. Examples of self-healing flexible sensors comprise touch sensors, force sensors, strain sensors, In a next embodiment, the use of said Diels-Alder polymer or said composition in the manufacturing of 2D or 3D structures, more particular in the manufacturing of robotic and electronic parts is disclosed.

As previously mentioned, an example of robotic systems is the manufacturing of soft robotic system, such as soft grippers, which can be used in agriculture, e.g., for picking fruit. In these circumstances, the materials of these soft grippers should allow the handling of delicate fruits (e.g. strawberries) without damaging said fruits. In these circumstances, however, it is unavoidable that these soft grippers are damaged, e.g., by sharp twigs and thorns. This is only one example where the specific characteristics of self-healing Diels-Alder polymers offer great advantages when being applied in the field of robotics.

In some embodiments, said soft robotic actuators may comprise a number of bending soft pneumatic actuators (BSPA). Together, these BSPAs may be used more particularly as finger-like structures of said soft robotic systems, such as soft grippers. The bendability thereof allows movement of said finger-like structures mimicking human-like hand gestures.

In the case of using said Diels-Alder polymers for the production of soft robotic systems, another advantage should be mentioned over polymers which are only able to heal after heating said Diels-Alder polymers (e.g. up to 80, 90° C.). The latter have the disadvantage that, after cooling down to 25° C., it takes the material up to 24 hours to reach a near equilibrium crosslink density and, hence, regain its initial properties. The former provides for autonomous healing of the Diels-Alder polymers at room temperatures, resulting in a constant crosslink density of the material after and throughout the healing process. Only at the damage location, the crosslink density might be affected and reduced, but as shown in the examples hereinafter, such reduction in crosslinking can be avoided when using the Diels-Alder polymers according to the invention. The faster the damaged surfaces are brought into contact with one another, and in particular when done with properly realigned surfaces, the crosslink density of the material during and after healing can be kept quasi constant even close to the damage location. Therefore, the Diels-Alder concentration will change only at the damage location during damaging and healing, providing more constant actuator properties.

In a next embodiment, the use of said Diels-Alder polymer or said composition in a method selected from the list comprising: filament extrusion, fused filament fabrication, direct ink writing, selective laser sintering, injection moulding, compression moulding, casting or soft lithography, is disclosed.

In a following aspect, a 2D or 3D structure comprising said Diels-Alder polymer or said composition is disclosed.

EXAMPLES

As described herein before, the self-healing characteristics of the Diels-Alder polymers is based on the reversible crosslinking reaction between the furan functionalized polyether amines according to formula (I) with a polymaleimide. FIG. 1 shows a chemical Diels-Alder reaction scheme between a furan A and maleimide B group resulting in a Diels-Alder reaction product C. This network is based on a reversible Diels-Alder reaction between the functional furan A and maleimide group B, effectuating the self-healing characteristics and being a strong covalent bond.

Synthesis

In this example, the synthesis of Diels-Alder polymers as the reaction product of a composition comprising a polymaleimide and a monomeric unit according to an embodiment of the invention is disclosed. The synthesis is based on a two-step reaction resulting in the reaction product.

In the first step, polyether amines are functionalized with furan functional groups via an irreversible epoxy-amine reaction with furfuryl glycidyl ether (FGE), resulting in a furan-functionalized polyether amine. For this the compounds are mechanically mixed with stoichiometric epoxy-amine ratio and left to react at 60° C. for 5 days and at 90° C. for two days, upon continuous mixing. A list of suitable polyether amines can be found in table 1.

TABLE 1

A list of suitable polyether amines used as a polymaleimide.

| polyether amines | Structure | Molar mass g $mol^{-1}$ | NH Functionality | Functional weight g $mol^{-1}$ $eq^{-1}$ |
|---|---|---|---|---|
| T403<br>T3000<br>T5000 | 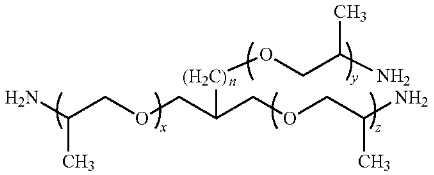 | 463<br>2916<br>6104 | 5.4<br>6<br>5.9 | 86<br>486<br>1040 |
| D230<br>D400 | 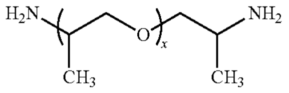 | 63<br>432 | 4<br>4 | 217<br>108 |
| D2000<br>D4000 | | 1986<br>4546 | 4<br>4 | 497<br>1137 |

In the second step, the resulting furan-functionalized polyether amines are reversibly crosslinked by reaction with a maleimide-containing monomer. A list of suitable maleimide-containing monomers can be found in table 2.

TABLE 2

A list of suitable maleimide-containing monomers.

| Maleimide | Chemical structure | Molar mass (g $mol^{-1}$) | Maleimide Functionality |
|---|---|---|---|
| 1,1'-(methylenedi-4,1-phenylene)bismaleimide (DPBM) | 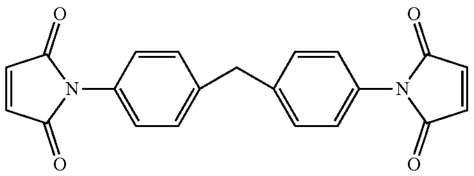 [SMILES: O=C1C=CC(=O)N1c1ccc(Cc2ccc(N3C(=O)C=CC3=O)cc2)cc1] | 358.36 | 2 |
| N,N'-(1,3-phenylene) dimaleimide | 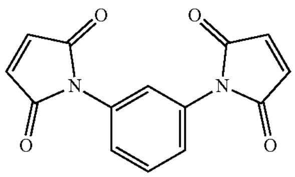 [SMILES: O=C1C=CC(=O)N1c1cccc(N2C(=O)C=CC2=O)c1] | 265.22 | 2 |

TABLE 2-continued

A list of suitable maleimide-containing monomers.

| Maleimide | Chemical structure | Molar mass ($g\ mol^{-1}$) | Maleimide Functionality |
|---|---|---|---|
| N,N'-(1,4-phenylene) dimaleimide | 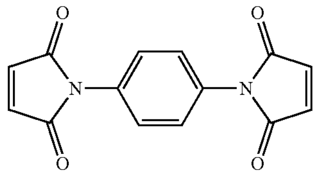 [SMILES: O=C1C=CC(=O)N1c1ccc(N2C(=O)C=CC2=O)cc1] | 265.22 | 2 |
| Polyphenylmethane bismaleimide | 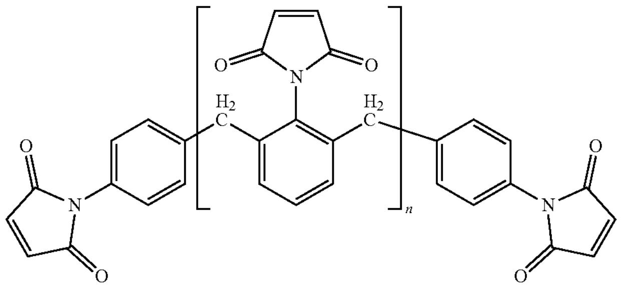 | 508.9 | 2.8 |

The chemical reversible reaction which occurs between the furan and maleimide functional groups of the furan-functionalized polyether amines and the maleimide-containing monomers is illustrated in FIG. 1. The furan-functionalized polyether amine, the maleimide-containing monomer (e.g. DPBM) and a radical scavenger (e.g hydroquinone) are mixed using a solvent (e.g. chloroform) and homogenization thereof is performed. After that, the resulting solution is casted into a mould. Hereafter, a solvent evaporation step is performed in vacuum. It is important to note that the reaction occurs at room temperature. In some embodiments, when liquid bismaleimides are used, a solvent may not be required.

Lowering the Healing Temperature

To lower the healing temperature towards room temperatures, the network mobility and the available reactive groups at 25° C. have to be increased. Network mobility can be increased through decreasing the Diels-Alder (DA) crosslink density. This crosslink density is affected by the molar mass of the monomer units; i.e., of the furan-functionalized compounds of formula (I) and of the maleimide compound. Increasing the molar mass (e.g. from furan functionalized T3000 (FT3000) to furan-functionalized T5000 (FT5000) decreases the DA crosslink density, which results in a higher molecular mobility δ and a higher flexibility, expressed in lower mechanical Young's modulus E (3 samples were tested) (Table 3).

A second parameter that influences the crosslink density is the ratio between maleimide and furan noted r:

$$r=[M]_0/[F]_0 \qquad \text{Eq. 1}$$

In which $[M]_0$ and $[F]_0$ are, respectively, the initial concentration of maleimide and furan used at the start of the synthesis of the network. Decreasing the stoichiometric ratio r, leads to a deficit of maleimide and a decrease in crosslink density, which again increases molecular mobility. Table 3 comprises a number of specific mechanical properties linked to a number of Diels-Alder polymer networks according to embodiments of the current invention. DPBM is used as a maleimide-containing monomer and both T3000, T5000, T403 and D400 are used as polymaleimides and were functionalized with furan functional groups resulting in FT3000, FT5000, FT403 and FD400, respectively. The corresponding maleimide-to-furan stoichiometric ratios are represented as "r". E is the Young's modulus, E' the storage modulus, E" the loss modulus and δ the loss angle.

TABLE 3 mechanical properties linked to a number of Diels-Alder polymer networks according to one or more embodiments of the current invention.

| | r | E (MPa) | E' (MPa) | E" (MPa) | δ (°) |
|---|---|---|---|---|---|
| DPBM-FT3000-r1 | 1 | 139.0 | 202.4 | 23.4 | 6.6 |
| DPBM-FT5000-r1 | 1 | 7.9 | 16.7 | 2.15 | 8.3 |
| DPBM-FT5000-r5/6 | 0.833 | 4.1 | 3.98 | 0.58 | 8.2 |
| DPBM-FT5000-r4/6 | 0.667 | 1.9 | 1.67 | 0.26 | 8.7 |
| DPBM-FT5000-r3/6 | 0.5 | 0.12 | 0.46 | 0.08 | 9.9 |
| DPBM-FT3000-r0.52 | 0.52 | 3.77 | 4.73 | 1.32 | 13.5 |
| DPBM-FD400-r0.4 | 0.4 | 0.56 | | | |
| DPBM-FT403-r0.25 | 0.25 | 0.88 | | | |

In previous work, room-temperature healing of Diels-Alder networks was established by increasing only the number of reactive groups by judicious choice of monomers with lower molecular weight (M. M. Diaz, J. Brancart, G. Van Assche, and B. Van Mele, "*Room-temperature versus heating-mediated healing of a Diels-Alder crosslinked polymer network*," Polymer, vol. 153, pp. 453-463, 2018). This resulted in an increase in crosslink density and, hence, a tougher elastomer. Because of the limited molecular mobility, only healing efficiencies up to 40% could be reached at 30° C. (based on fracture stress).

In what follows, it will be experimentally demonstrated that the DPBM-FT5000 network with stoichiometric maleimide-to-furan ratio r=3/6=0.5 has enough network mobility and reactive components to heal macroscopic damage at room temperature with high healing efficiency. High network mobility is translated in a highly flexible character as indicated by the mechanical properties in Table 3. Generally, the available reactive components at the fracture surfaces are limited in networks with a low crosslink density, resulting in a slow healing that takes several days to fully recover initial properties. The present invention describes an increase in network mobility required to perform healing, achieved by lowering the crosslink density through decreasing the maleimide-to-furan ratio r (like done in the r=0.5 material), rather than to decrease both the maleimide and the furan concentration in a stoichiometric network by using larger polyether amines. The excess of furan present in the off-stoichiometric Diels-Alder polymer provides more reactive furan components at the fracture surface, which enhances the healing rate. Furthermore, the excess of furan also provides that the concentration of furan remains at more elevated levels as the healing occurs, which enhances the rate of the Diels-Alder reaction.

Instantaneous Room-Temperature Healing

To check the healing ability at room temperature, DPBM-FT5000-r0.5 samples with a width of 5.5 mm and a thickness of 2 to 2.5 mm were synthesized. A first test was performed by cutting a sample in two using a knife and immediately putting the fracture surfaces back together manually. After firmly pressing the two halves together for 3 seconds, the two parts were already merged and the part could be strained perpendicular to the cut for a few percent without fracture. This first non-quantitative experiment illustrates that a part of the healing is instantaneous. Upon fracture, Diels-Alder bonds are broken at the surface, and reactive maleimide and furan components are generated. Upon bringing the fracture surfaces back in contact only a few seconds after damage, the available reactive components immediately start to react with each other. The first interfacial covalent bonds as well as physical interaction, such as Van der Waals forces, and interdiffusion of pendant chains, lead to the instantaneous healing of the parts. As only few covalent bonds are formed immediately, due to the reaction kinetics, the interface has still a very limited strength. It mainly relies on adhesion rather than on covalent bonding and the sample can only resist very limited stresses.

Healing Efficiency as a Function of Healing Time

Because of the limited amount of available reactive components at the fracture surface in low crosslink density Diels-Alder networks and because of the slow reaction kinetics at 25° C., the healing of macroscopic damages takes time. In a second experiment, the healing efficiency, based on the recovery of the fracture strain and fracture stress, is experimentally measured as a function healing time. Samples with a width of 5.5 mm and a thickness of 2-2.5 mm were subjected to stress-strain tensile tests until fracture. As a reference, 6 (undamaged) samples were fractured in a stress-strain test. These samples failed on average around a strain of 245% and a stress of 0.1 MPa. The Young's modulus of this material, the slope of the tangent line in the origin of the stress-strain curve, is 0.12 MPa.

Next, 24 samples were sliced in two using a clean scalpel blade. Immediately after the cut, the two ends were brought back in contact manually. When macroscopic misalignments are avoided while fitting the fracture surfaces back together, the instant healing ability of the DPBM-FT5000-r0.5 network allows to precisely merge the parts together, such that the cut is no longer visible when investigated using optimal microscopy. These samples were left to heal at room temperature for 1 day, 3 days, 7 days, or 14 days. For each healing time, 6 samples were fractured in the stress-strain test under the same conditions as for the reference samples. The mean fracture stresses and strains are presented in the block diagrams in FIG. 3B In FIG. 3C, the mean healing efficiencies for the different healing times (Ht) were calculated by comparing the fracture strains e and stresses a with those measured in the reference experiment:

$$\eta_\varepsilon(Ht)=\varepsilon_{fract}(Ht)/\varepsilon_{fract}(\text{not damaged}) \quad \text{Eq. 3}$$

$$\eta_\sigma(Ht)=\sigma_{fract}(Ht)/\sigma_{fract}(\text{not damaged}) \quad \text{Eq. 4}$$

Figure 3:
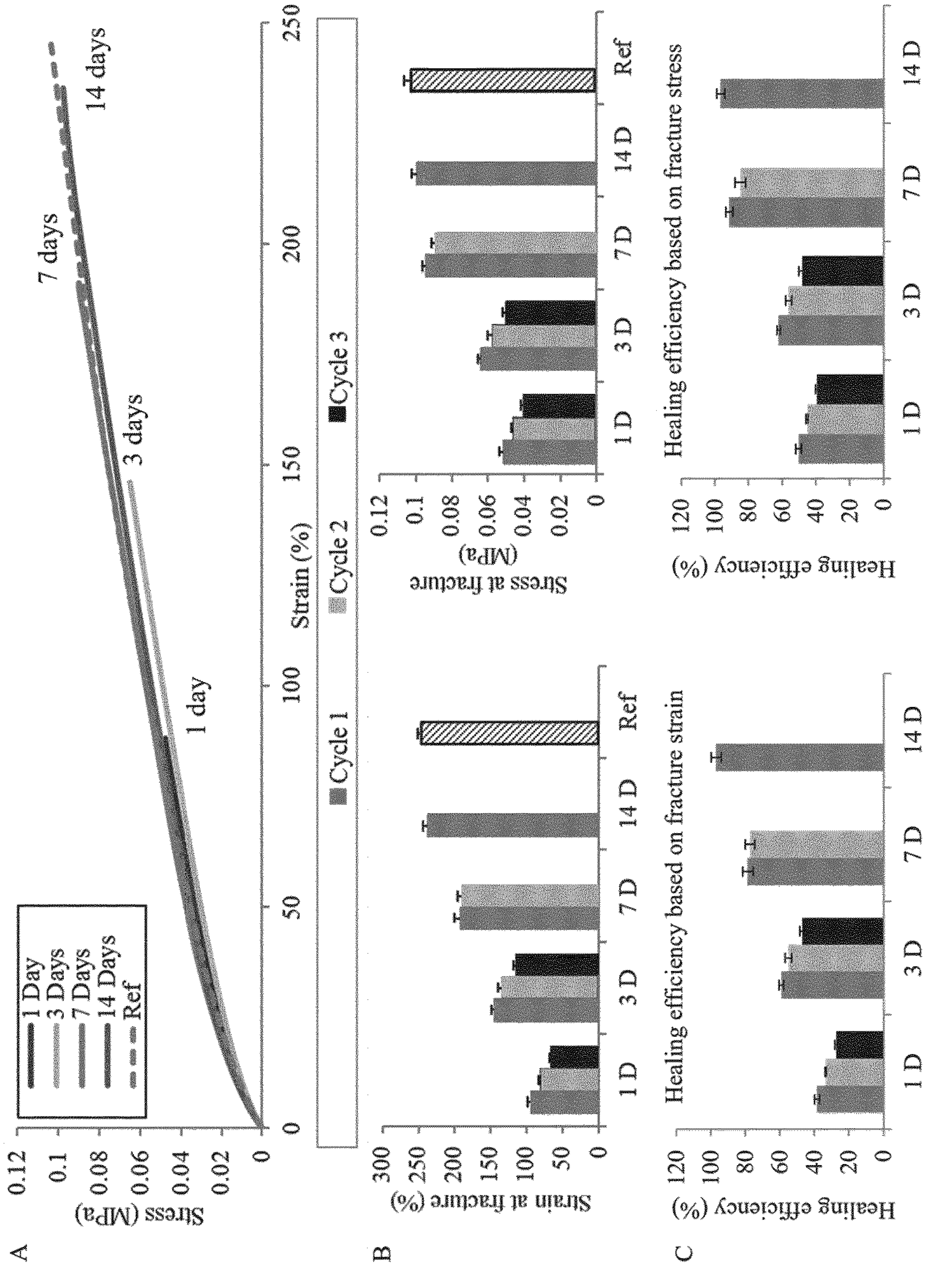
FIG. 3, also abbreviated as FIG. 3: A) Comparison of stress-strain curves of reference (undamaged) samples and samples that were cut all the way through and subsequently healed at room temperature for 1 day, 3 days, 7 days and 14 days. Stress-strain tests are performed with a strain ramp of 1% $s^{-1}$. B) Mean values (of 6 samples) of the strain and stress at fracture, derived through tensile testing, are presented for the reference sample and samples that are healed for 1 day, 3 days, 7 days and 14 days at 25° C. C) Healing efficiencies based on the fracture strain and fractures stresses of the healed samples relative to fracture parameters of the reference samples. Error bars represent the standard error of the mean (SEM).

FIG. 3A illustrates that after healing at room temperature very similar stress-strain characteristics are measured, but failure occurs at much lower stresses. Creating interfacial Diels-Alder bonds clearly takes time, which is due to slow reaction kinetics. After healing for 1 day at 25° C., only 50% of the fracture stress ($\eta_\sigma$) is recovered (FIG. 3C). Visual inspection showed that the fracture took place at the same location as where the cut was made previously. The formed fracture surfaces looked again clean. The healing efficiencies ($\eta_\varepsilon$ and $\eta_\sigma$) can be increased by prolonging the healing time. Indeed, after 3 days, 7 days, and 14 days, the fracture stress has recovered by respectively 62%, 91%, and 97%. Although the Diels-Alder reactions are generally considered to be too slow for room temperature autonomous healing, the increasing failure strength over time clearly proves the contribution of the reformation of these reversible links to the healing process at room temperature. After 14 days of healing at room temperature, the fracture did no longer take place at the location where the cut was made, but rather at a location where an imperfection causes stress concentrations (e.g., a cavity caused by a solvent bubble or a dust particle). Taking into account the standard deviations of the mean (SEM) presented on the block diagrams in FIG. 3C and the fact that fracture does not take place at the location of the "scar" of the cut, it can be concluded that after 14 days, the cuts are completely healed and that the initial strength of the samples has been recovered completely. The presented results are all obtained at 25° C. At lower application temperatures healing takes slightly longer, while at higher temperatures, the duration of healing will be shortened.

Design of Soft Actuators that Heal at Room Temperature

To illustrate that the Diels-Alder polymers according to the invention are suitable to develop soft robotic components that can heal at room temperature, bending soft pneumatic actuators (BSPA) were constructed using this material. The design is based on previously published BSPAs (details on the design and working principle in [S. Terryn, J. Brancart, D. Lefeber, G. Van Assche, and B. Vanderborght, "*Self-healing soft pneumatic robots*," Science Robotics, vol. 2, no. 9, 2017] and [S. Terryn, E. Roels, G. Van Assche, and B. Vanderborght, "*Self-Healing and High Interfacial Strength in Multi-Material Soft Pneumatic Robots via Reversible Diels-Alder Bonds,*" *Actuators: Special issue on pneumatic soft actuators*, vol. 9, no. 34, pp. 1-17, 2020]). The new BSPA is made entirely out of the DPBM-FT5000-r0.5. Because of the hyperelasticity of this network (Young's modulus 0.12 MPa, derived from a stress strain curve—data not shown), the bottom sheet is now thicker, 3.5 mm compared to the design in [S. Terryn, et al., 2020]. The manufacturing of this actuator will not be addressed in this application as it is identical to the shaping process used for the BSPA, described in [S. Terryn, et al., 2020].

Five identical actuators were manufactured out of DPBM-FT5000-r0.5. By placing the five BSPAs in one soft hand assembly, their usability for social soft robotics applications was demonstrated. The five fingers can be controlled separately, which permits the hand to perform simple hand gestures that can be used in social soft robots to express emotions.

The healing ability of the BSPAs is demonstrated by applying macroscopic cuts all the way through the soft membranes at different locations on the actuator. For these tests, a clean blade was used.

The first cut (length of 12 mm and all the way through) was made in the thick bottom sheet, perpendicular to the longitudinal axis of the non-inflated actuator. When the blade is taken out, the elastic response of the DA material pushes the cut surfaces back together. The actuator was left untouched for only 30 seconds after which it was inflated. After only 30 seconds of healing at room temperature the actuator was airtight and could recover its performance. Airtightness was confirmed when the actuator was submerged in water and no air bubbles escaped through the membrane during actuation over the full bending range. From the previous material tests (FIG. 3A), it is known that the cut is far from fully healed after only 30 seconds. However, during actuation, the freshly healed cut perpendicular to the longitudinal axis is compressed, increasing contact. As such, the instantaneous adhesion that relies on secondary interactions and the very low number of covalent Diels-Alder bonds are sufficient to keep the actuator airtight. The definition of full recovery of the actuator is: "when the cut is healed and remains completely airtight in the full actuation range of the actuator, while the actuator performance is recovered". As a result, for this particular damage the actuator is fully healed after only 30 seconds.

In a second test, a cut with the same size as in the first test was made in the bottom thick sheet, but now along the longitudinal axis of the actuator. During inflation, the stresses on this cut are larger, and 30 seconds of healing time was not sufficient to make the actuator airtight again. For this cut, which has the same dimensions but another orientation, a healing time of 2 hours at room temperature is required. In the first test, after 30 seconds, we can only say there is enough adhesion to keep the cut closed, as we do not know whether Diels-Alder bonds already play an important role. In the case of the cut along the longitudinal axis of the actuator stresses on the scar during actuation are higher and it is clear covalent bonds are needed to keep the actuator airtight (physical adhesion is not enough). After 2 hours, enough interfacial Diels-Alder bonds were formed to keep the part airtight during actuation.

A third cut was made in the thinner top membrane of one of the rectangular cells. In this membrane, the stresses during actuation are higher than the ones in the bottom layer. This translates in a longer healing time of 16 hours, because much more Diels-Alder bonds have to be formed across the cut surfaces to ensure sufficient interfacial strength to keep the actuator airtight. However, even these damages could be healed without the need of a heat stimulus and in a relatively short time of 16 hours.

Figure 2:
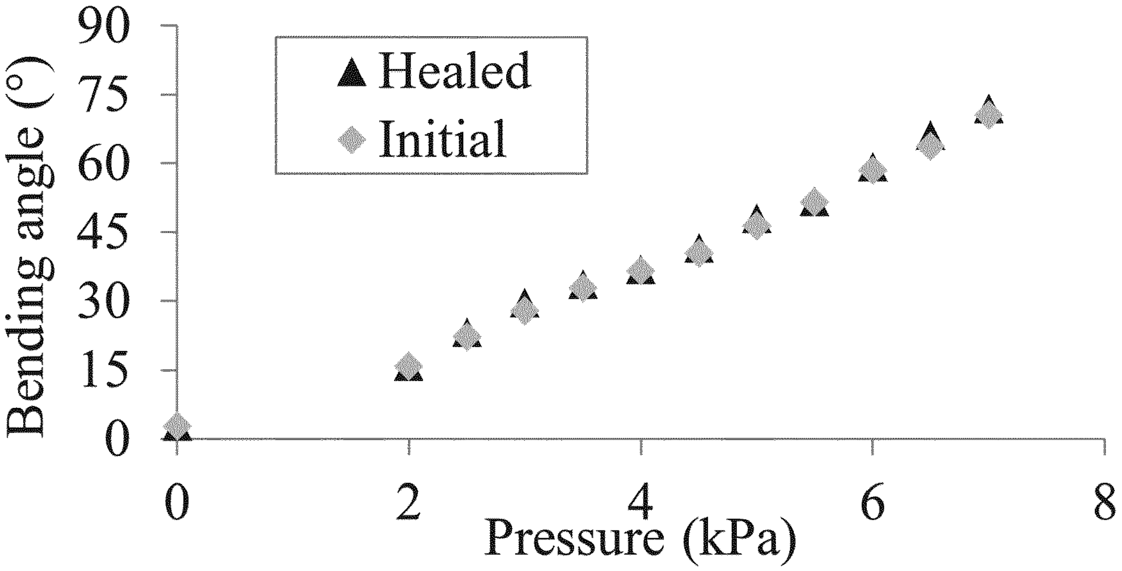
FIG. 2, also abbreviated as FIG. 2: After being cut through completely and healed, the actuator was again completely airtight and could be pressurized without leaking. The bending angle as a function of the overpressure of the healed actuator shows no measurable difference compared to the initial characterisation prior to damage.

To push the healing ability to its limits, one of the finger actuators was completely severed. Immediately after damage, the two halves were precisely, though manually, fit together. Next, the actuator was left to heal for 7 days at room temperature. After this longer healing procedure, sufficient Diels-Alder bonds should have been formed all across the large cut to reuse the actuator. To validate the recovery of the initial actuator performance, the bending characteristic of the healed actuator was measured and compared to the characteristic of the undamaged actuator (FIG. 2). The same characteristic was measured after damage, indicating that the actuator properties were fully recovered.

Influence of the Maleimide-To-Furan Ratio r on the Network Properties

A design parameter for the polymers according to the present invention is the stoichiometric ratio between the initial maleimide concentration and the initial furan concentration r (see Eq. 1). To illustrate the effect of this r parameter, two networks are compared, DPBM-FT5000-r0.83 and DPBM-FT3000-r0.52, that have equal crosslink density at 25° C., equal maleimide and furan functionality, but different maleimide-to-furan ratio r (see Table 4). Using (Eq. 5), stoichiometric ratio r were selected for the FT5000 and FT3000 based networks to achieve the same crosslink density at 25° C.

$$x_{eq}=\frac{K_{C,DA}\left(1+\frac{1}{r}\right)[M]_0+1-\sqrt{\left(K_{C,DA}\left(1+\frac{1}{r}\right)[M]_0+1\right)^2-\frac{4K_{C,DA}^2[M]_0^2}{r}}}{2K_{C,DA}[M]_0\left(\frac{1}{C_0}\right)} \quad \text{Eq. 5}$$

Wherein $x_{eq}$ is the equilibrium conversion, $C_0$ is a standard concentration of 1 mol·kg$^{-1}$, $K_{C,DA}=K_{C,exo}+K_{C,endo}$, $K_{C,exo}$ and $K_{C,endo}$, are the equilibrium constants for exo and endo isomer adducts at the appropriate temperature, and $[M]_0$ is the initial maleimide concentration.

Although, having the same crosslink density $[DA]_{eq}$ at 25° C., the DPBM-FT3000-r0.52 network has a larger excess of furan concentration $[F]_{eq}$. In the present case, the stoichiometric ratio r is altered by changing the ratio between the monomers used, whilst the crosslink density parameter is affected. The present invention shows the effect of stoichiometric ratio on the material properties, while keeping crosslink density at 25° C. and functionality constant.

TABLE 4

DA networks with different stoichiometric maleimide-to-furan ratio r.

| Monomers | f | M/f (g · mol$^{-1}$) | Elastomers | r | $[M]_0$ (mol · kg$^{-1}$) | $[F]_0$ (mol · kg$^{-1}$) | $[DA]_{eq,25°C.}$ (mol · kg$^{-1}$) | $[M]_{eq,25°C.}$ (mol · kg$^{-1}$) | $[F]_{eq,25°C.}$ (mol · kg$^{-1}$) |
|---|---|---|---|---|---|---|---|---|---|
| DPBM | 2 | 179 | | | | | | | |
| FT5000 | 6 | 1114 | DPBM-FT5000 | 0.83 | 0.65 | 0.79 | 0.64 | 0.01 | 0.14 |
| FT3000 | 4 | 702 | DPBM-FT3000 | 0.52 | 0.64 | 1.25 | 0.64 | 0.00 | 0.61 |

Figure 4:
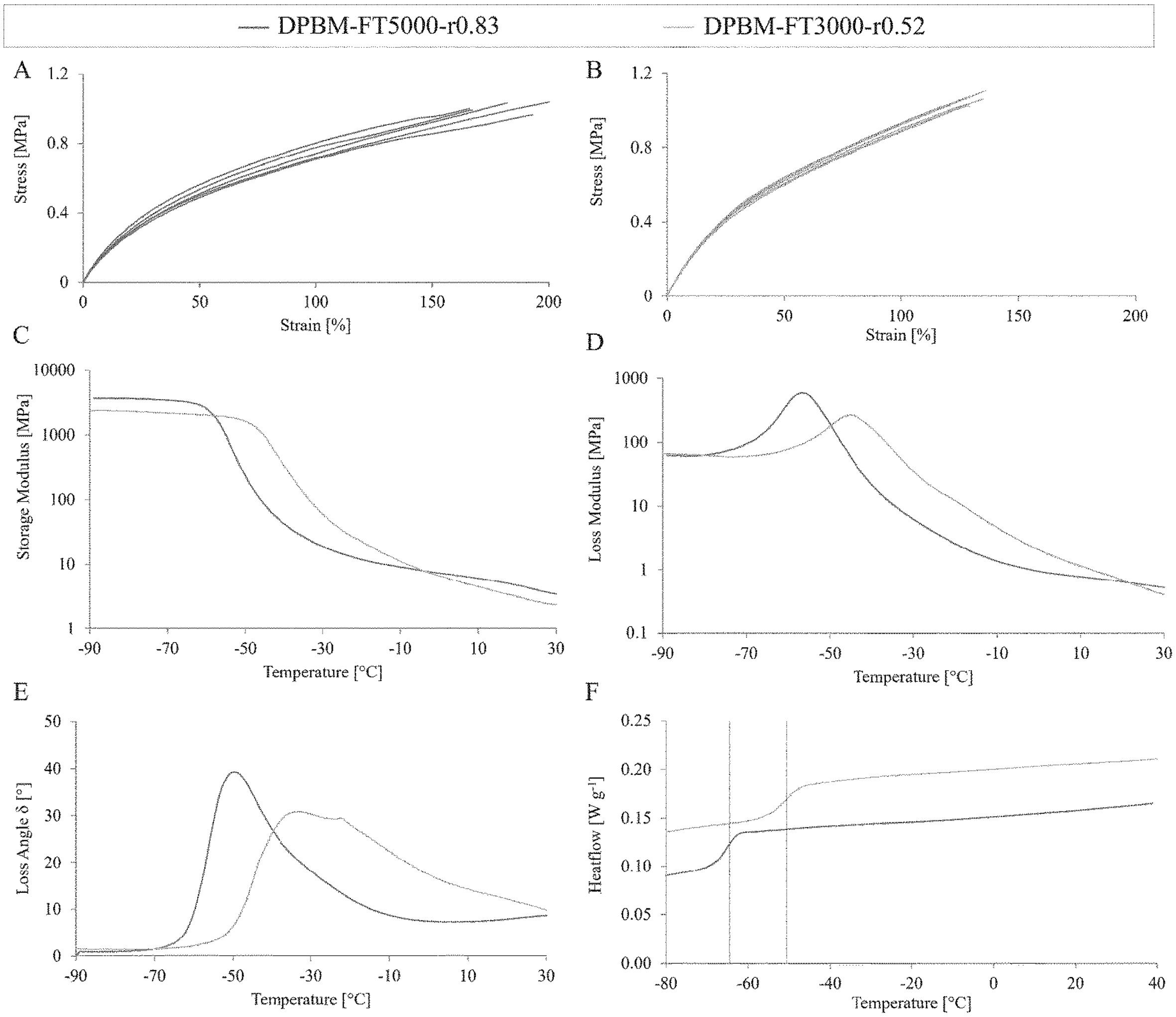
FIG. 4, also abbreviated as FIG. 4: Effect of stoichiometric ratio r on the mechanical properties of the DA network, illustrated by DPBM-FT5000-r0.83 and DPBM-FT3000-r0.52. A, B) Tensile testing using a strain ramp of $1\%\cdot s^{-1}$ until fracture. The resulting engineering stress is plotted as function of the engineering strain. C, D, E) DMA performed in a temperature window of −80 to 100° C. with a temperature ramp of $1\ K\cdot min^{-1}$, an oscillating strain with amplitudes of 0.2% and a frequency of 1 Hz. From the measured oscillating stress, the storage modulus E' (C), loss modulus E" (D) and loss angle δ (E) can be derived. F) DSC at a heating rate of $5\ K\cdot min^{-1}$.

At 25° C., the networks have the same crosslink density, which leads to a similar stress-strain characteristic, obtained in a tensile test upon fracture with a strain ramp of 1%·s-1 (FIG. 4A, B). In addition, at room temperatures they have similar storage modulus (E'), loss modulus (E") and loss angle (δ), derived through DMA (FIG. 4C, D, E). Consequently, based on their mechanical properties (see Table 5) these networks can be used for the same application at room temperatures.

TABLE 5

Glass transition $T_g$ and mechanical properties at 25° C. for networks with varying stoichiometric maleimide-to-furan ratio r.

| Elastomer | Tg(° C.) | E'(MPa) | E"(MPa) | δ(°) | E(MPa) |
|---|---|---|---|---|---|
| DPBM-FT5000-r0.83 | −64.1 | 3.98 | 0.58 | 8.3 | 2.4 |
| DPBM-FT3000-r0.52 | −50.4 | 3.14 | 0.58 | 10.2 | 2.7 |

When decreasing the temperature below room temperature, the crosslink densities in the network remain identical for the two networks (conversions $x_{eq}$≈1). Yet, upon cooling below 25° C., the storage modulus (E') and loss modulus (E") of the network increase much faster for the lower stoichiometric ratio network, the DPBM-FT3000-r0.52 (FIG. 4C, D). This is explained by the higher concentration of dangling chains in the network. As a result, the entangled polymer chains in between the crosslinks are packed denser, leading to less mobility. This is translated in a glass transition $T_g$ at higher temperature both seen in DMA (FIG. 4D, maximum in the loss modulus) and DSC (FIG. 4F and see Table 5).

Figure 5:
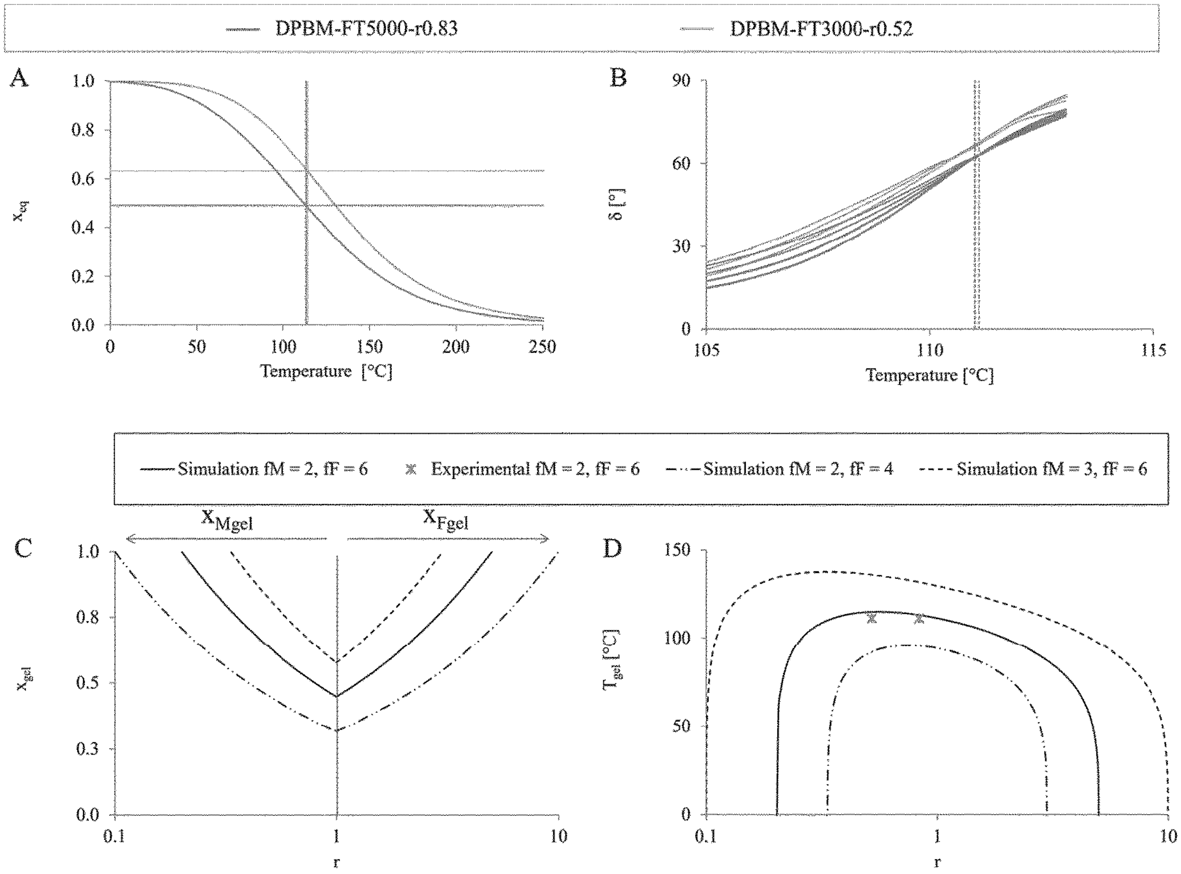
FIG. 5, also abbreviated as FIG. 5: The effect of stoichiometric ratio r on the equilibrium conversion $x_{eq}$, gel conversion $x_{gel}$ and gel transition temperature $T_{gel}$. A) The equilibrium conversion $x_{eq}$ as function of temperature calculated using Equation 7. The simulated equilibrium $T_{gel}$ is defined as the temperature at which $x_{eq}$ is equal to the gel conversion defined by the Flory-Stockmayer equation. B) $T_{gel}$ is experimentally derived through dynamic rheometry as the temperature at which the loss angle δ is frequency independent. Samples were exposed to the temperature ramp of $0.2\ K\cdot min^{-1}$, while subjected to an oscillating strain with amplitude of 10% and frequencies of 10, 6.31, 3.98 and 2.51 Hz. $T_{gel}$ is the temperature, at which the isofrequency lines intersect. $x_{gel}$ (C) and $T_{gel}$ (D) as function of r for networks with different maleimide ($f_M$) and furan ($f_F$) functionality.

At higher temperatures, above 25° C., for networks with different stoichiometric ratios, the conversion $x_{eq}$ deviates and as such the crosslink densities $[DA]_{eq}$ deviate (FIG. 5A). The reason for this is that the excess of furan pushes the equilibrium towards the formation of DA bonds (Equation 7). As a result, the lower stoichiometric ratio network has a higher DA conversion at high temperatures. When simulating the gel transition temperature $T_{gel}$, the equilibrium conversion $x_{eq}$ is compared at each temperature with the gel conversion $x_{gel}$. This is, aside from the functionalities $f_M$ and $f_F$, also depended on the maleimide-to-furan ratio r, as stated in the Flory-Stockmayer equation and FIG. 5C. For lower maleimide-to-furan ratios the $x_{gel}$ is higher, as less Diels-Alder bonds need to be broken to have delegation of the network, due to a higher excess of furan. As for the networks both the $x_{eq}$ and $x_{gel}$ change, and as they have an opposite effect on the position of gel transition temperature, $T_{gel}$ is almost identical for these networks. (FIG. 5A). This is confirmed experimentally by multifrequency dynamic rheometry measurements in which $T_{gel}$, detected as the temperature at which δ is frequency independent, are very similar for these networks (FIG. 5B).

In FIG. 5D, $T_{gel}$ is simulated as function of the maleimide-to-furan ratio r for networks with a crosslink density at 25° C. of 0.64 mol·kg$^{-1}$ and different maleimide ($f_M$) and furan ($f_F$) functionality. Looking at the networks with $f_M$ of 2 and $f_F$ of 6, $T_{gel}$ is influenced by r, most importantly below 0.25 and above 2. Between these values, the influence on $T_{gel}$ is more limited, as is confirmed by the slight difference between DPBM-FT5000-r0.83 and DPBM-FT3000r-r0.52 (FIG. 5A, B). Changing the functionality of the monomers that constitute the network in this region however, results in a large change in $T_{gel}$, as is illustrated by in FIG. 5D.

The maleimide-to-furan ratio r has an important influence on the reaction kinetics of the Diels-Alder reaction. Lowering the stoichiometric ratio r leads to an excess of furan reactive groups, leading to a faster approach to equilibrium. This is illustrated by simulating the formation/polymerization of both networks DPBM-FT5000-r0.83 and DPBM-FT3000-r0.52 at 25° C. (FIG. 6A), by the increase in conversion x=[DA]/[$M_0$], starting from an initial state with conversion equal to 0 (unreacted). A higher excess of furan in the DPBM-FT3000-r0.52 network leads to a faster increase of conversion towards the equilibrium conversion state at 25° C. (dashed lines in FIG. 6A).

Figure 6:
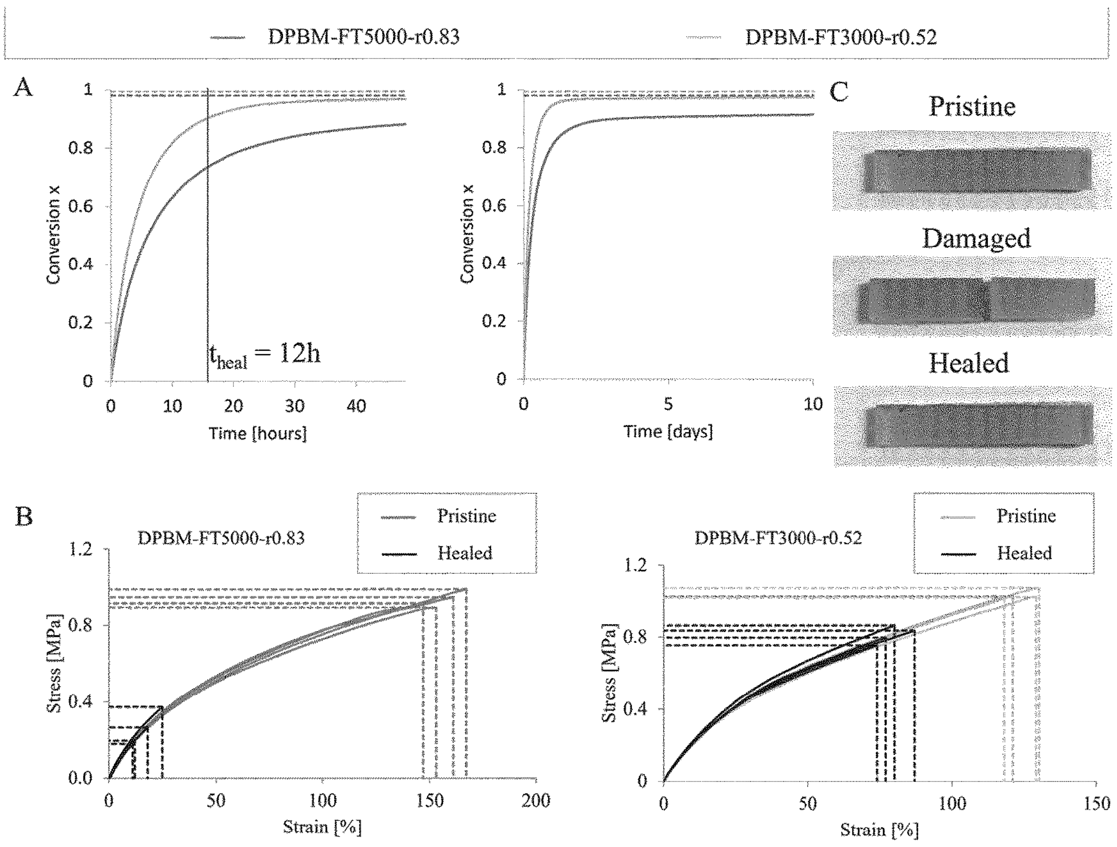
FIG. 6, also abbreviated as FIG. 6: The effect of stoichiometric ratio r on the reaction speed and healing speed. A) Simulation of the increase in conversion x at 25° C., as function of time, in the DPBM-FT5000-r0.83 and DPBM-FT3000-r0.52 networks, starting from 0 conversion. B) Tensile testing until fracture with a strain ramp of $1\%\cdot s^{-1}$ on undamaged pristine samples as well as on samples that underwent a damage-heal cycle. The latter were cut in half using a scalpel blade. The fracture surfaces were brought immediately back in contact and the samples were healed for 12 hours at 25° C.

The excess furan groups does not only speed up the synthesis, but also healing. Under the hypothesis that all bonds are broken at the fracture surface, the conversion is 0 right after damage. When bringing fracture surfaces immediately back in contact at 25° C. the formation of bonds across the fracture interface will be much faster in networks with an excess of furan reactive components as simulated in FIG. 6A. This is confirmed experimentally by tensile testing on pristine and healed samples (FIG. 6B). For both networks, DPBM-FT5000-r0.83 and DPBM-FT3000-r0.52, four pristine samples were fractured in a tensile test with strain ramp of 1%·s$^{-1}$. Four other samples were cut completely in halve with a scalpel blade, after which they were brought in contact immediately. These samples were left to heal at 25° C. for 12 hours and subsequently tested to assess the healing efficiency (Table 6). While the stress at fracture is recovered with an efficiency of 27% for the DPBM-FT5000-r0.83, the DPBM-FT3000-r0.52 with a higher furan excess achieves a much higher healing efficiency of 78%. This results from the difference in conversion at 12 hours of healing, which is 0.675 and 0.856 for the DPBM-FT5000-r0.83 and DPBM-FT3000-r0.52, respectively. This illustrates how the healing performance of a Diels-Alder polymers can be increased by having an excess of furan. As shown in the present application, longer healing times at 25° C. lead eventually to almost entire recovery of the initial properties of 91% and 97% in damaged DPBM-FT5000-r0.5 samples after respectively 7 and 14 days. Similarly healing performance can be increased by an excess of maleimide (r>1) as this also leads to a faster increase of the concentrations. However, to do this maleimides with higher functionality ($f_M$>2) are needed.

TABLE 6

Healing efficiencies based on the recovery of mechanical properties after healing. Samples were cut in halve and healed at 25° C. for 12 hours. Crosslink densities and conversions were simulated based on the isothermal of 12 hours.

| Elastomer | [DA] (mol · kg$^{-1}$) | x | η (E) (%) | η ($\sigma_f$) (%) | η ($\xi_f$) (%) |
|---|---|---|---|---|---|
| DPBM-FT5000-r0.83 | 0.442 | 0.675 | 102 | 27 | 11 |
| DPBM-FT3000-r0.52 | 0.552 | 0.856 | 102 | 78 | 64 |

Figure 7:
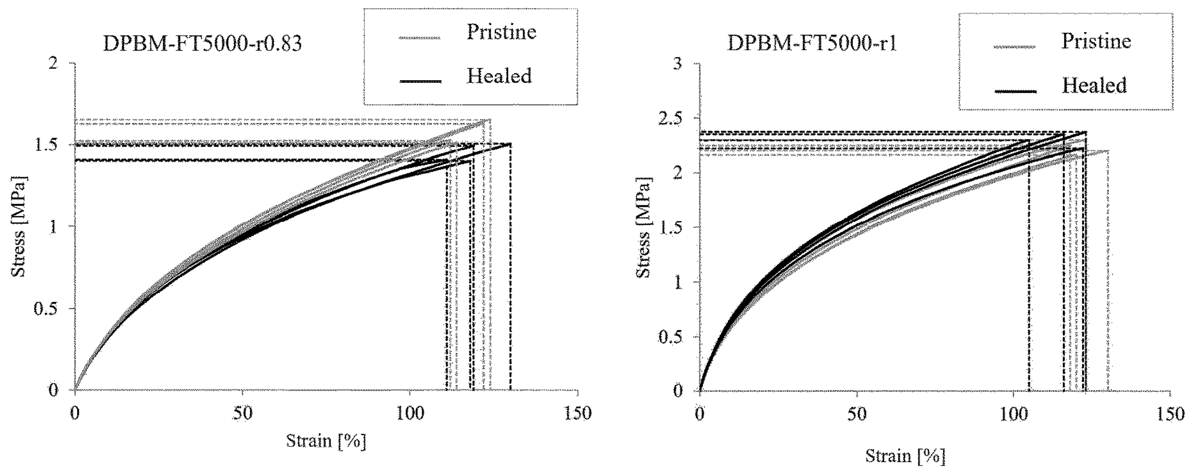
FIG. 7, also abbreviated as FIG. 7: Healing tests on non-autonomous self-healing DA networks, DPBM-FT5000-r1 and r0.83, through tensile tests until fracture with a strain ramp of $1\%\cdot s^{-1}$ on pristine samples and on samples that underwent a damaged-heal cycle.

Although reversible networks based on the Diels-Alder chemistry are in general labeled as non-autonomous self-healing materials, the experiments clearly show that this excess of reactive compounds allows to create Diels-Alder networks that heal at room temperature. This is interesting for soft robotic applications as this excludes the need of an additional heating system, thus decreasing the complexity of the system. Networks with a higher stoichiometric ratio can heal as well, however a temperature increase is required to increase the kinetics of the Diels-Alder reaction in order to perform healing in a reasonable amount of time, e.g. order of hours. This is illustrated by the healing tests on the DPBM-FT5000-r1 and DPBM-FT5000-r0.83 networks presented in FIG. 7. Samples that were cut completely in half and were exposed to 80° C. for 40 min, were healed with high healing efficiencies (Table 7). The advantages of non-autonomous self-healing materials in soft robotics, is a higher control over the healing procedure. Healing can be performed at any desired time, while for autonomous healing the healing is preferred to be immediately.

TABLE 7

Healing efficiencies based on the recovery of mechanical properties after healing. Samples were cut in half and healed by 80° C. for 40 min.

| Elastomer | η (E) (%) | η ($\sigma_f$) (%) | η ($\xi_f$) (%) |
|---|---|---|---|
| DPBM-FT5000-r0.83 | 97 | 92 | 101 |
| DPBM-FT5000-r1.00 | 105 | 104 | 95 |

In further experiments, the mechanical and healing properties of reversible networks DPBM-FD400-r0.4 and DPBM-FT403-r0.25 were assessed. The Diels-Alder polymers were obtained following the synthesis protocol described in the present invention, starting from Jeffamine D400 (for DPBM-FD400-r0.4) or Jeffamine T403 (for DPBM-FT403-r0.25), bismaleimide DPBM, FGE and hydroquinone as radical scavenger. The stoichiometric ratio r of the initial maleimide-to-furan concentrations prior to polymerization is 0.4 for DPBM-FD400-r0.4 and 0.25 for DPBM-FD400-r0.25. Healing tests using tensile testing until fracture have been performed on both networks. Static stress strain tests were performed in tension with a strain ramp of 1% $s^{-1}$. The healed sample was recovering from being cut completely in half. Recontact was made at 25° C. and after 12 h for DPBM-FD400-r0.4 and 1 h for DPBM-FT403-r0.25 at 25° C., the samples were tested in tensile testing up to fracture. Healing efficiencies were derived from comparing the healed sample with a reference, an undamaged sample. Results of the tests are shown here below:

DPBM-FD400-r0.4

| | Healed | | Undamaged | |
|---|---|---|---|---|
| Strain at fracture $\varepsilon_f$ | 287 | % | 301 | % |
| Stress at fracture $\sigma_f$ | 0.119 | MPa | 0.124 | MPa |
| Young's Modulus E | 0.52 | MPa | 0.55 | MPa |
| Healing efficiency based on E | 94 | % | | |
| Healing efficiency based on $\sigma_f$ | 91 | % | | |
| Healing efficiency based on $\varepsilon_f$ | 95 | % | | |

DPBM-FD400-r0.25

| | Healed | | Undamaged | |
|---|---|---|---|---|
| Strain at fracture $\varepsilon_f$ | 226 | % | 234 | % |
| Stress at fracture $\sigma_f$ | 0.115 | MPa | 0.121 | MPa |
| Young's Modulus E | 0.81 | MPa | 0.88 | MPa |
| Healing efficiency based on E | 92 | % | | |
| Healing efficiency based on $\sigma_f$ | 95 | % | | |
| Healing efficiency based on $\varepsilon_f$ | 97 | % | | |

Conclusion

For the first time, soft robotic actuators were developed that are able to recover their performance after severe damage at room temperature, without the need for an externally applied stimulus. These actuators were constructed from a newly developed autonomous self-healing polymer network, excluding the need of additional heating devices that would increase the complexity of the overall robotic system. The self-healing polymer network that is based on the reversible Diels-Alder (DA) reaction, was designed to increase the molecular mobility by means of working at a low maleimide-to-furan ratio. This lowers the crosslink density and results in an excess of furan groups, compensating the lower maleimide concentration, and resulting in a faster approach to equilibrium. A DA network was synthesized that can heal catastrophic macroscopic damage autonomously at room temperature. The healing efficiency of a fractured part, evaluated through the recovery of the stress at fracture, is 62%, 91%, and 97%, after 3 days, 7 days, and 14 days, respectively. This material was used to develop a self-healing soft pneumatic hand. Relevant large cuts could be healed entirely, without the need of a heat stimulus. Depending on the size of the damage and, even more, on the location of the damage, complete healing takes only seconds or up to a week. For this evaluation, the actuator was considered to be healed whenever it is completely airtight and the scar does not tear open during actuation. Damage on locations on the actuator that are subjected to very small stresses during actuation was healed instantaneously. Although only a limited amount of DA bonds is formed across the merged fracture surfaces in seconds, this provides sufficient interfacial strength to keep the actuator airtight during actuation. Severe damage, like cutting the actuator in two, took 7 days to heal, without the need of any external heat stimulus and resulted in full recovery of the actuator performance. Based on the experiments above, it is illustrated that when modifying the stoichiometric ratio between maleimide and furan, while keeping the other parameters constant, mainly the reaction speed and consequently the healing rate is influenced. Lower maleimide-to-furan ratios result in an excess of furan reactive groups and lead to faster healing. By means of the present invention, it is proven that for DA networks with a high excess of furan, the healing can be performed without an external heat stimulus at room temperature in the order of hours. Autonomous intrinsic healing is in many applications advantageous and desired as it excludes the need of a system that provides the heat. However, non-autonomous healing provides excellent control over the timing of the healing procedure. Control over when the healing will be scheduled is desired in (robotics) applications in which partially damaged components can continue operation with reduced performance or a compensated behavior and can be healed when less or no activity is required. The stoichiometric ratio network design parameter will allow to tune the healing time and temperature of DA networks to fit requirements imposed by the application.

The invention claimed is:

1. A Diels-Alder-based polymer comprising the reaction product of a composition comprising a polymaleimide and a monomeric unit according to formula (I):

(I)

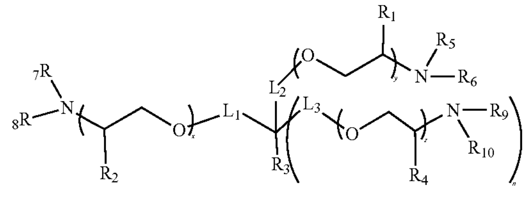

wherein:

$R_1$, $R_2$, $R_3$, and $R_4$ are independently selected from H or $C_1$-$C_4$ alkyl;

$R_5$, $R_6$, $R_7$, $R_8$, $R_9$, and $R_{10}$ are independently selected from H or A;

each A independently represents a furan-comprising functional group;

$L_1$, $L_2$, and $L_3$ are independently selected from a direct bond or a divalent $C_1$-$C_4$ alkyl;

n is 0 or 1; and x+y+z is an integer selected from 1 to 75;

wherein the polymaleimide and the monomeric unit each comprise a functionality of at least 2; the sum of the functionalities of both the polymaleimide and the monomeric unit is at least 4.6; and a maleimide-to-furan stoichiometric ratio between the polymaleimide and the monomeric unit ranges from 0.20 to 0.65.

2. The Diels-Alder-based polymer according to claim 1, comprising a maleimide or a furan functionality of from 3 to 8.

3. The Diels-Alder-based polymer according to claim 1, wherein the furan-comprising functional group is selected from furfuryl ethers, furfuryl glycidyl ether, furfuryl alcohols, 2-furoic acid, and 3-furoic acid.

4. The Diels-Alder-based polymer according claim 1, wherein the polymaleimide is selected from 1,1'-(methylenedi-4,1-phenylene)bismaleimide, N,N'-(1,4-phenylene) dimaleimide, N,N'-(1,3-phenylene)dimaleimide, and polyphenylmethanebismaleimide.

5. The Diels-Alder-based polymer according to claim 1, wherein $R_1$, $R_2$, $R_3$, and/or $R_4$ are $CH_3$.

6. The Diels-Alder-based polymer according to claim 1, wherein $L_1$, $L_2$, and/or $L_3$ are $—CH_2—$.

7. A composition comprising the Diels-Alder-based polymer according to claim 1.

8. The composition according to claim 7, further comprising a radical scavenger.

9. The composition according to claim 8, wherein the radical scavenger is selected from hydroquinone butylated hydroxytoluene, 4-tert-butylcatechol, and methyl-p-benzoquinone.

10. The composition according to claim 7, wherein the composition is a self-healing material.

11. A 2D or 3D structure comprising the composition according to claim 10.

12. A method of preparing the Diels-Alder polymer of claim 1, comprising:

(a) preparing a composition comprising a polymaleimide and a monomeric unit according to formula (I):

(I)

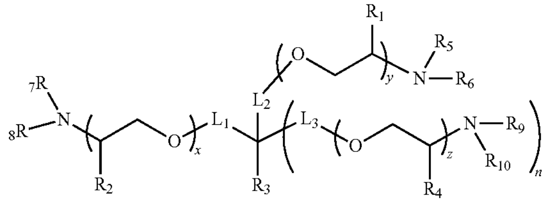

wherein:

$R_1$, $R_2$, $R_3$, and $R_4$ are independently selected from H or $C_1$-$C_4$ alkyl;

$R_5$, $R_6$, $R_7$, $R_8$, $R_9$, and $R_{10}$ are independently selected from H or A;

each A independently represents a furan-comprising functional group;

$L_1$, $L_2$, and $L_3$ are independently selected from a direct bond or a divalent $C_1$-$C_4$ alkyl;

n is 0 or 1; and x+y+z is an integer selected from 1 to 75;

wherein the polymaleimide and the monomeric unit each comprise a functionality of at least 2; the sum of the functionalities of both the polymaleimide and the monomeric unit is at least 4.6; and a maleimide-to-furan stoichiometric ratio between the polymaleimide and the monomeric unit ranges from 0.20 to 0.65; and (b) carrying out a Diels-Alder polymerization reaction between the polymaleimide and the monomeric unit according to formula (I).

13. The method according to claim 12, wherein the Diels-Alder polymer comprises a maleimide or a furan functionality of from 3 to 8.

14. The method according to claim 12, wherein the furan-comprising functional group is selected from furfuryl ethers, furfuryl glycidyl ether, furfuryl alcohols, 2-furoic acid, and 3-furoic acid.

15. The method according to claim 12, wherein the polymaleimide is selected from 1,1'-(methylenedi-4,1-phenylene)bismaleimide, N,N'-(1,4-phenylene)dimaleimide, N,N'-(1,3-phenylene)dimaleimide, and polyphenylmethanebismaleimide.

16. The method according to claim 12, wherein $R_1$, $R_2$, $R_3$, and/or $R_4$ are $CH_3$.

17. The method according to claim 12, wherein $L_1$, $L_2$, and/or $L_3$ are $—CH_2—$.

18. The method according to claim 12, wherein the composition further comprises a radical scavenger.

19. The Diels-Alder-based polymer according claim 1, wherein the Diels-Alder-based polymer is a self-healing polymer and self-healing occurs at temperatures below 30° C.

20. The Diels-Alder-based polymer according claim 1, wherein the Diels-Alder-based polymer has a self-healing efficiency of at least 80% after 7 days at 25° C.

* * * * *